United States Patent [19]

Hussey

[11] 4,132,126

[45] Jan. 2, 1979

[54] RATIO SELECT MECHANISM

[75] Inventor: David C. Hussey, Laguna Beach, Calif.

[73] Assignee: Bertea Corporation, Irvine, Calif.

[21] Appl. No.: 830,185

[22] Filed: Sep. 2, 1977

[51] Int. Cl.² ............................................. G05G 11/00
[52] U.S. Cl. ......................................... 74/479; 74/103; 74/105; 74/522; 244/84
[58] Field of Search ................. 74/479, 522, 516, 518, 74/103, 104, 105, 45; 92/13, 13.4; 244/84

[56] References Cited

U.S. PATENT DOCUMENTS

| | | | |
|---|---|---|---|
| 561,914 | 6/1896 | Peterson et al. | 74/45 |
| 743,147 | 11/1903 | Church | 74/45 X |
| 2,436,493 | 2/1948 | Shepard | 92/13 X |
| 2,628,595 | 2/1953 | Waldie et al. | 92/13.4 X |
| 2,910,875 | 11/1959 | Kuhnhausen | 74/522 X |
| 2,940,332 | 6/1960 | Teague, Jr. | 74/518 |
| 2,997,888 | 8/1961 | Rust, Jr. | 74/522 X |
| 3,218,874 | 11/1965 | Gerstenhauer | 74/522 X |

*Primary Examiner*—Allan D. Herrmann
*Attorney, Agent, or Firm*—Gordon L. Peterson

[57] ABSTRACT

A ratio select mechanism including a supporting structure, first and second rotary input members mounted on the supporting structure, and a connecting lever extending between the rotary input members. An output member is coupled to the connecting lever. The opposite ends of the connecting lever are mounted for movement on the rotary input members, respectively, along radially extending paths. By adjusting the relative radial positions of the end portions of the connecting lever, the authority which each of the rotary input members has over the output member can be adjusted.

14 Claims, 6 Drawing Figures

RATIO SELECT MECHANISM

BACKGROUND OF THE INVENTION

Certain control systems utilize multiple inputs, either separately or together, to provide an output. This occurs, for example, in systems for controlling the position of an aircraft flight control surface. In the case of an aircraft control system, the inputs may include a manual or pilot input and automatic input, such as may be derived from the autopilot or a stability augmenting system. Alternatively, redundant inputs may be used so that, if there is a failure in one, the other can be used to control the position of the control surface without false input from the failed input. With multiple inputs, it is necessary to select which of the inputs, or how much of each input, is to be used. In other words, the authority which each of the inputs has over the output can be adjusted.

SUMMARY OF THE INVENTION

The present invention provides a ratio select mechanism which is capable of selecting which of a plurality of inputs is to be used. It is also capable of dividing authority over the output between multiple inputs. Although the ratio select mechanism is particularly adapted for use in aircraft control systems and is described herein with reference to an aircraft control system, it has other applications.

In one application, the ratio select mechanism receives two inputs from the pilot's stick. The first of these is an electrical input which corresponds to the desired position of the control surface. The second of these is a mechanical input. In normal operation, only the electrical input is used. However, in case of a malfunction in the electrical system, the aircraft computer automatically shifts the ratio select mechanism so that thereafter, the mechanical input from the stick is utilized. The mechanical input derived from the pilot's stick commands the same position that the electrical input would command without the malfunction. Thus, in this example, the ratio select mechanism is used to switch in the backup mechanical system in case of an electrical failure.

This invention is particularly applicable to a ratio select mechanism which includes a supporting structure, first and second rotary input members, and means for mounting the first and second rotary input members on the supporting structure for rotational movement about first and second rotational axes, respectively. The first and second rotary input members are adapted to be rotationally driven about their respective rotational axes by first and second inputs, respectively. Although various geometrical arrangements can be employed, it is preferred to have the rotational axes be substantially coaxial.

A connecting lever extends between the rotary input members. The connecting lever is mounted for two different movements and performs at least two important functions. First, the connecting lever is mounted for shifting movement, and this determines the degree of authority which each of the inputs has over the output. Secondly, the connecting lever is adapted to be driven by the rotary input members to provide output motion which can be used to drive an output member.

To provide the shifting movement, the connecting lever has first and second end portions which are mounted on the first and second rotary input members for movement along first and second paths, respectively. Each of these paths has a component which extends radially of the associated rotational axis, and preferably, each of the paths extends radially.

The control which each of the rotary input members exerts is a function of the radial spacing between the associated end portion of the connecting lever and the rotational axis of such input member. If the ratio select mechanism is to be capable of preventing one of the inputs from exerting any influence over the output, then the associated end of the connecting lever should be movable to the rotational axis of the corresponding rotary input member. In this position, such rotary input member will have no control over the output even though rotational input is provided to that rotary input member.

An output member is coupled to the connecting lever at an output region of the connecting lever. The connecting lever in its output motion, drives the output member along an output path. Although the output path may be of different configurations and extend in different directions, in one preferred form of the invention, it extends linearly and transverse to the rotational axis of the rotary input members.

The output region can be at different locations along the connecting lever depending upon the desired drive ratio between the output member and each of the rotary input members. For equal drive ratios, the output region should be located halfway between the end portions of the connecting lever, and such an arrangement is preferred.

Although various arrangements are possible, the output member may also serve to assist in mounting the connecting lever for shifting movement. In a preferred form of the invention, the connecting lever is pivotally attached to the output member. In one preferred embodiment, the output member is mounted for pivotal movement about a pivot axis extending transverse to the axes of the rotary input members, and the connecting lever is pivotally attached to the output member about a pivot axis which is perpendicular to the first-mentioned pivot axis.

The shifting movement or radial spacing between the end portions of the connecting lever and the rotational axes of the rotary input members can be controlled in many different ways. For example, a shifting member can be employed intermediate the output member and the first rotary input member. Although various arrangements can be used, the shifting member can advantageously be mounted on the supporting structure for movement along a linear path extending perpendicular to the axes of the rotary input members and transverse to the output path.

The shifting member can also be used to control the movement of the connecting lever. For example, the shifting member may be slotted to cause the connecting lever to pivot and/or translate within the slot. Thus, the connecting lever moves as permitted by the rotary input members and the shifting member. The shifting member can itself be moved in various different ways, such as hydraulically.

In use, rotary movement of the first rotary input member drives the first end portion of the connecting lever so long as the first end portion is not at the rotational axis of the first rotary input member. The degree of authority which each rotary input member has over movement of the connecting lever increases with the radial spacing between the rotational axis of each rotary input member and the associated end portion of the connecting lever. Thus, if the second rotary input member is to have total control over the output member, the first end portion of the connecting lever should be moved so as to lie on the rotational axis of the first rotary input member.

The connecting lever serves as a summing lever to sum the inputs from the rotary input members. If both of the end portions of the connecting lever are radially spaced from the associated rotational axes, authority over the output member is divided between the two rotary input members in accordance with the relative radial spacing between the end portions and the rotational axes.

Although the mounting means for the end portions of the connecting lever can take different forms, such means can advantageously include a groove in the face of each of the input members and a ball or spherical surface at the end portions of the connecting lever. To increase bearing area and to reduce stress, the spherical end portion can be received in a shoe which is in turn slidably received within the groove in the rotary input member. The shoe serves as a race for the ball, and consequently, unit loading is substantially reduced.

The invention, together with further features and advantages thereof, can best be understood by reference to the following description taken in connection with the accompanying illustrative drawings.

DESCRIPTION OF THE PREFERRED EMBODIMENTS

Figure 1:
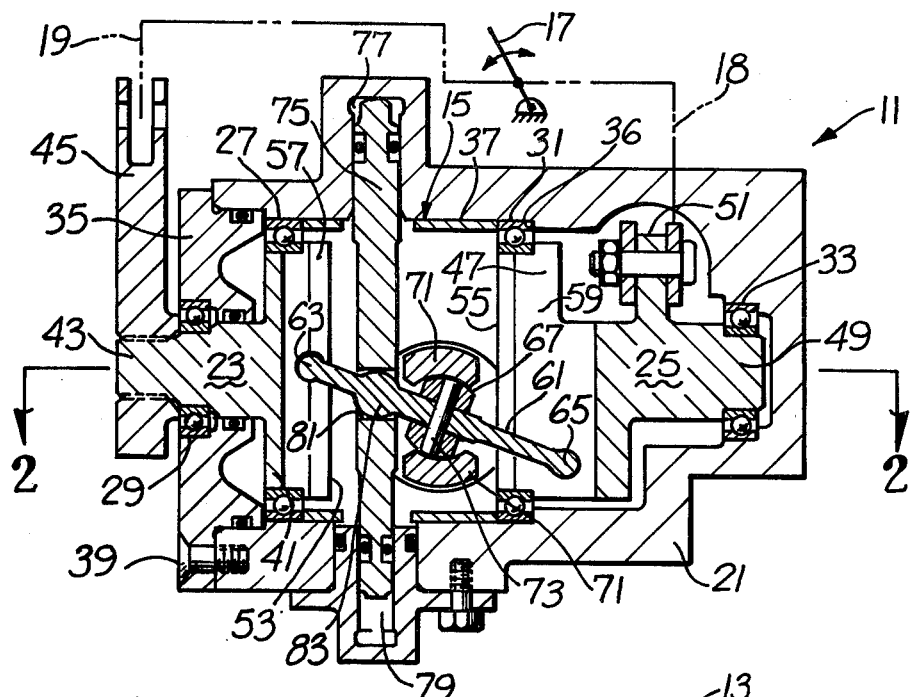
FIG. 1 shows a control system for a flight control surface of an aircraft with the control system including a ratio select mechanism constructed in accordance with the teachings of this invention.

FIG. 1 shows a control system 11 for positioning a control surface 13 of the aircraft. The control system includes a ratio select mechanism 15 arranged to receive a plurality of inputs. Although various inputs can be utilized, in the embodiment illustrated, the inputs are redundant and are derived from pilot input provided by the usual pilot's stick 17. For example, motion of the stick 17 can be converted to an electrical signal and transmitted over a transmission link 18 in the usual manner for a fly-by-wire system. The link 18 also includes the necessary hydraulic and mechanical components to convert the electrical signal to mechanical motion at the ratio select mechanism 15.

The other of the inputs derived from the stick 17 is primarily mechanical and is transmitted from the stick 17 through a transmission link 19 which may be, or include, a mechanical linkage.

The ratio select mechanism 15 includes a supporting structure in the form of a housing 21, a first rotary input member 23 and a second rotary input member 25. The rotary input members 23 and 25 are suitably rotatably mounted within the housing 21 for rotational movement about coaxial rotational axes. In the embodiment illustrated, the rotary input member 23 is mounted by bearings 27 and 29, and the rotary input member 25 is rotatably mounted by bearings 31 and 33. The bearings 27 and 31 are tightly held against an end plate 35 and a shoulder 36 formed in the housing by a sleeve 37. The end plate 35 closes one end of the housing and is removably attached to the remainder of the housing in any suitable manner, such as by screws 39. The bearings 29 and 33 are suitably retained in the end plate 35 and the housing 21, respectively.

The rotary input member 23 has a head portion 41 and a shaft 43. The shaft 43 projects axially through the end plate 35 is joined to an input crank 45 in any suitable manner. The input crank 45 is in turn coupled to receive input motion from the stick 17 via the transmission link 19.

The rotary input member 25 similarly has a head portion 47 received in the bearing 31 and a shaft 49 received in the bearing 33. The rotary input member 25 also has an input lever 51 which is driven by the pilot's stick 17 via the transmission link 18.

Figure 2:
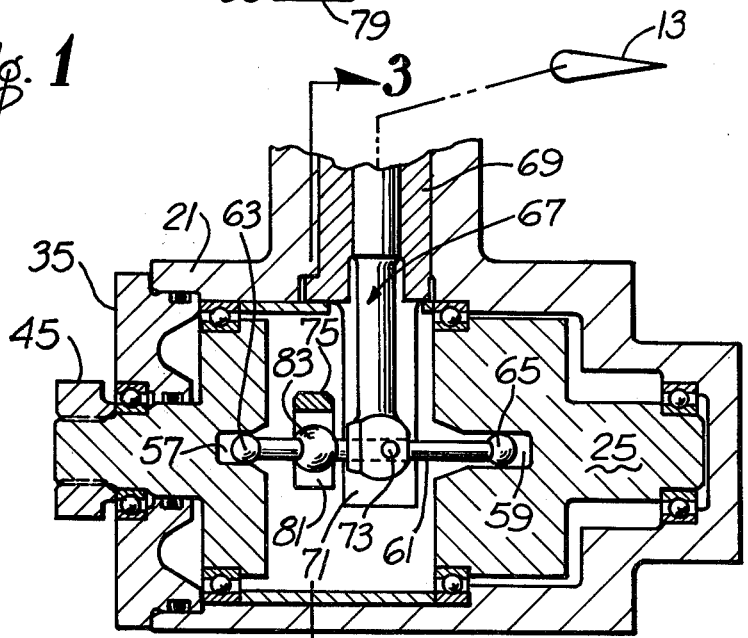
FIG. 2 is a sectional view taken generally along line 2—2 of FIG. 1.

The head portions 41 and 47 face each other and terminate in planar parallel faces 53 and 55, respectively. The head portions 21 and 27 have axially opening, radially extending grooves 57 and 59, respectively, each of which, in the embodiment illustrated, extend along a diameter from one region of the circumference to the opposite region of the circumference. As shown in FIG. 2, each of the grooves 57 and 59 is flared or widened near the axial outer ends thereof.

A connecting lever 61 extends between the rotary input members. The connecting lever 61 has opposite end portions 63 and 65 in the form of partially spherical balls, and these end portions are slidably received within the grooves 57 and 59, respectively.

In the position shown in FIGS. 1 and 2, the end portion 63 is at the rotational axis of the rotary input member 23, and the end portion 65 is spaced radially from the rotational axis of the rotary input member 25. The connecting lever 61 forms a right triangle with the axis of the rotary input members 23 and 25 with the connecting lever forming the hypotenuse of the right triangle. The connecting lever 61 is mounted for pivotal movement about two pivot axes. In the embodiment illustrated, this is accomplished by coupling the connecting lever 61 to an output member 67. In the embodiment illustrated, the output member 67 is a slide of a spool valve and is mounted by a housing 69 (FIG. 2) including housing extensions 71 for movement along an output path which extends axially of the output member and transverse to the rotational axes of the rotary input members 23 and 25. The housing 69 also allows the output member 67 to rotate or pivot somewhat along the output path, and this permits the radial spacing between the end portions 63 and 65 and the rotational axes of the input members 23 and 25 to be adjusted.

The connecting lever 61 is pivotally attached to the output member 67 by a pin 73 extending through the output member and the center of the connecting lever. This spaces the output member 67 radially from the axes of the rotary input members 23 and 25 a distance equal to one-half the distance between such axes and the center of the end portion 65. This pivotally mounts the connecting lever 61 for movement about a pivot axis which is perpendicular to the output path. In addition, because the output member 67 can pivot about the output path, the connecting lever can also pivot about the output path.

The valve of which the output member 67 and the housing 69 form parts may be a conventional hydraulic valve of the type commonly used to control, through intermediate components, such as an actuator, a flight control surface. Thus, the motion of the output member 67 along the output path can be utilized in a known manner to position the control surface 13.

Figure 5:
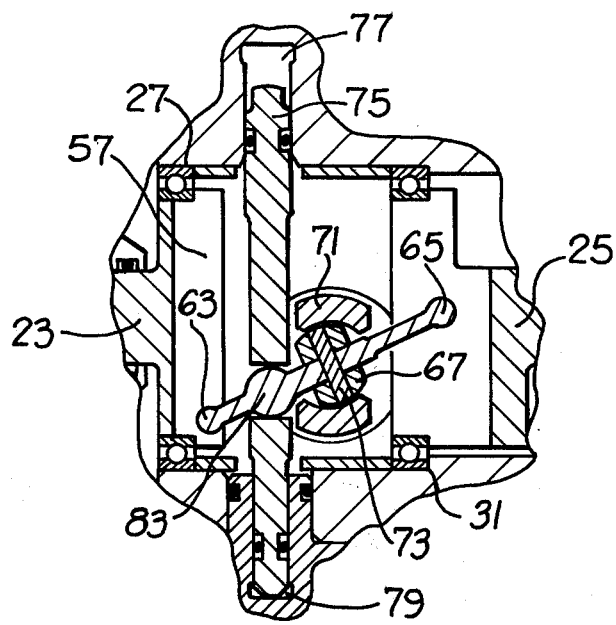
FIG. 5 is a view similar to FIG. 1 with the connecting lever in a different position.

A shifting member 75 can be used to move and guide the connecting lever through its shifting movement from the position shown in FIGS. 1 and 2 to the position shown in FIG. 5. The shifting member 75, in the embodiment illustrated, is in the form of an elongated piston mounted within the housing 21 between the output member 67 and the input member 23 for movement along a path which is perpendicular to the rotational axes of the rotary input members 23 and 25 and transverse to the output path of the output member 67. The housing 21 is configured to form chambers 77 and 79 into which hydraulic fluid under pressure can be forced to move the shifting member 75 to either of the positions shown in FIGS. 1 and 5, or intermediate positions. Of course, the shifting member 75 can be moved in various other ways.

Figure 3:
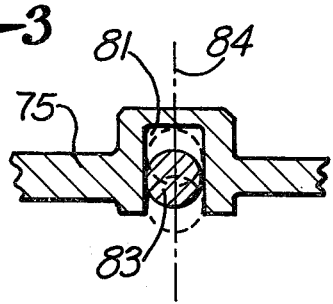
FIG. 3 is a fragmentary sectional view taken generally along line 3—3 of FIG. 2 and showing a portion of the shifting member and connecting lever.

Another function of the shifting member 75 is to cause, in response to rotary input, the connecting lever 61 to pivot in a single plane for a fixed position of the shifting member. In the embodiment illustrated, this is accomplished by providing a slot 81 in the shifting member 75 (FIGS. 1-3) and a ball 83 on the connecting lever 61 which is adapted to be slidably received within the slot. The slot has an axis 84 (FIG. 3) which is transverse to the rotational axes of the input members 23 and 25 and parallel to the output path of the output member 67.

In operation, the basic function of the ratio select mechanism 15 is to determine what authority each of the transmission links 18 and 19 will have over the control surface 13. Although the ratio select mechanism 15 is capable of permitting each of these inputs to exert partial control over the position of the control surface 13, for this particular application, either one or the other will have full authority over the control surface 13, except for transition periods, i.e., periods during which the ratio select mechanism is switching from one of the inputs to the other.

With the components of the ratio select mechanism 15 as shown in FIGS. 1 and 2, the mechanical transmission link 19 has no control over the position of the control surface 13, and the electrical transmission link 18 has 100 percent authority over the position of the control surface. The reason for this is that the center of the ball-shaped end portion 63 of the connecting lever 61 lies on the rotational axis of the rotary input member 23. Accordingly, rotational movement of the rotary input member 23 can impart no movement to the connecting lever 61.

Figure 6:
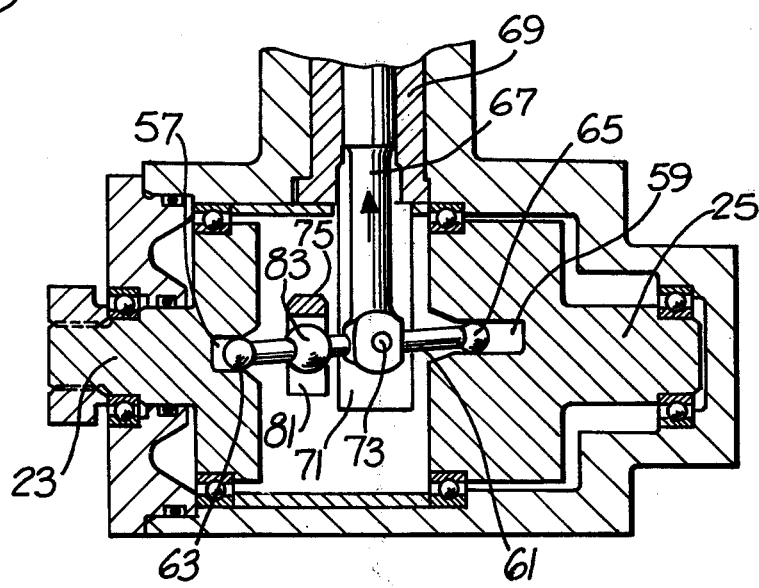
FIG. 6 is a view similar to FIG. 2 with the connecting lever in the same position as FIG. 1 and with one of the rotary inputs rotated from the position shown in FIG. 1.

On the other hand, the end portion 65 is spaced radially from the rotational axis of the rotary input member 25. Consequently, when the input lever 51 is rotated, (FIG. 6) the end portion 65 of the connecting lever 61 is moved. When the end portion 65 is moved, the end portion 63 does not translate, but it does permit the connecting lever 61 to pivot in virtually any direction in the groove 57. However, the slot 81 cooperates with the end portion 63 and the groove 57 to cause the connecting lever 61 to pivot in a single plane, which plane contains the axis 84 (FIG. 3), the center of the spherical end portion 63 and the output path of the output member 67. The pin 73 allows the connecting lever 61 to pivot in this plane so as not to bind up on the output member 67. Consequently, the output member 67 is moved along the output path to thereby control, through one or more intermediate elements (not shown), the position of the control surface 13. In normal use of the ratio select mechanism 15, the rotary input members 23 and 25 may have inputs that range, for example, up to about plus or minus 30 degrees on either side of neutral. This imparts sufficient movement to the output member 67 to control the position of the control surface 13 without introducing significant nonlinearities.

To shift the authority over the control surface 13 from the transmission link 18 to the transmission link 19, hydraulic fluid under pressure is admitted to the chamber 77, and the chamber 79 is exposed to a relatively lower fluid pressure. Consequently, the shifting member 75 is moved downwardly as viewed in FIGS. 1 and 5 to the position shown in FIG. 5. During this movement of the connecting lever 61, the end portions 63 and 65 slide in their respective grooves 57 and 59, and the output member 67 is pivoted about the output path via the connecting lever 61 and the pin 73. In the position shown in FIG. 5, the center of the ball-shaped end portion 65 lies on the rotational axis of the input member 25.

The shifting member 75 moves downwardly the precise amount to place the center of the ball-shaped end portion 65 on the rotational axis of the input member 25. An appropriate stop, such as the end wall of the chamber 79, may be utilized to arrest the downward movement of the shifting member 75.

After shifting of the connecting lever 61 to the position shown in FIG. 5, the mechanical transmission link 19 has 100 percent authority over the control surface 13, and the rotary input member 25 is ineffective to transmit motion to the output member 67. As indicated hereinabove, this switchover to the mechanical transmission link 19 may be brought about in response to a failure in the electrical system which would prevent the transmission link 18 from properly controlling the control surface 13. During the transition, both of the end portions 63 and 65 are radially displaced from the rotational axes of the input members 23 and 25. Accordingly, during the transition, both of the transmission links 18 and 19 have authority over the output member and the output is gradually phased from one to the other.

Figure 4:
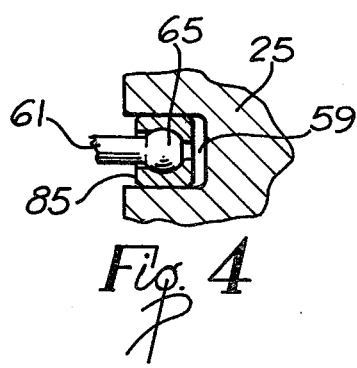
FIG. 4 is an enlarged sectional view showing a preferred way for mounting an end portion of the connecting lever in a slot of one of the rotary input members.

FIG. 4 shows a modification of the ratio select mechanism which permits higher loads between the connecting lever 61 and the rotary input member 25, it being understood that a similar arrangement may be used between the connecting lever and the rotary input member 23. As shown in FIG. 4, a shoe 85 has a spherical interior and receives the ball-shaped end portion 65. The shoe 85 has smooth outer surfaces, and the shoe is slidably received in the groove 59. This construction eliminates the point-type loading which tends to exist when a ball contacts a flat surface. Consequently, with the construction shown in FIG. 4, the unit loading is substantially reduced.

Although exemplary embodiments of the invention have been shown and described, many changes, modifications and substitutions may be made by one having ordinary skill in the art without necessarily departing from the spirit and scope of this invention.

I claim:

1. A ratio select mechanism comprising:
a supporting structure;
first and second rotary input members;
means for mounting said first and second rotary input members on said supporting structure for rotational movement about first and second rotational axes, respectively;
a connecting lever extending between said rotary input members, first and second portions of said connecting lever being adjacent said first and second rotary input members, respectively;
means for mounting said first portion of said connecting lever on said first rotary input member for movement along a first path having a component which extends radially of said first rotational axis whereby the radial spacing between the first portion of said connecting lever and said first rotational axis can be adjusted;
means for mounting said second portion of said connecting lever on said second rotary input member for movement along a second path having a component which extends radially of said second rotational axis whereby the radial spacing between the second portion of said connecting lever and said second rotational axis can be adjusted;
said connecting lever being movable in response to rotational movement of said first rotary input member about the first rotational axis when the first portion of said connecting lever is spaced from the first rotational axis and being movable in response to rotational movement of said second rotary input member about the second rotational axis when the second portion of said connecting lever is spaced from the second rotational axis, a portion of said connecting lever being an output region; and
means for moving said first and second portions of said connecting lever along said first and second paths, respectively, to adjust the control which each of said rotary input members has on the movement of said output region.

2. A ratio select mechanism as defined in claim 1 wherein said rotational axes are substantially coaxial.

3. A ratio select mechanism as defined in claim 1 wherein said first portion of said connecting lever is a first end portion of said connecting lever and the means for mounting said first end portion of said connecting lever includes a radially extending groove in said first rotary input member, said first end portion being received in said groove.

4. A ratio select mechanism as defined in claim 1 wherein said moving means includes a shifting member and means for mounting said shifting member on said supporting structure for movement along a path, said shifting member being engageable with said connecting lever to move said connecting lever as the shifting member moves along its path.

5. A ratio select mechanism as defined in claim 1 including an output member, means for mounting said output member for movement along an output path, and means for pivotally coupling the connecting lever to said output member at said output region whereby said output region of said connecting lever is constrained to move generally along said output path.

6. A ratio select mechanism as defined in claim 5 wherein said first and second portions of said connecting lever are first and second end portions of said connecting lever, respectively, and said output region is approximately halfway between said first and second end portions.

7. A ratio select mechanism as defined in claim 1 wherein said rotational axes are generally coaxial and the ratio select mechanism includes an output member, means for mounting said output member for generally linear movement along an output path which lies generally transverse to said rotational axes and for rotational movement about said output path, and means for pivotally attaching said connecting lever at said output region thereof to said output member for pivotal movement about an axis which is generally perpendicular to said output path, said moving means includes a shifting member and means for mounting said shifting member on said supporting structure for movement along a path.

8. A ratio select mechanism as defined in claim 1 wherein said means for mounting said first portion of said connecting lever includes a groove in said first rotary input member, said first portion of said connecting lever includes a ball, and a shoe receiving said ball and slidably receivable in said groove, said shoe forming a race for said ball.

9. A ratio select mechanism as defined in claim 1 wherein said rotational axes are substantially coaxial and said first and second portions of said connecting lever are first and second end portions, respectively, of said connecting lever, said ratio select mechanism includes an output member, means for mounting said output member for output motion along an output path and means for pivotally attaching said output member to said output region of said connecting lever.

10. In a control system for positioning a control surface of an aircraft wherein the control system includes first means for providing a first input for controlling the position of the control surface, second means for providing a second input for controlling the position of the control surface, and a ratio select mechanism for determining the authority which the first means and the second means has over the control surface, said ratio select mechanism comprising:
a supporting structure;
first and second rotary input members;
means for mounting said first and second rotary input members on said supporting structure for rotational movement about first and second rotational axes, respectively;
a connecting lever extending between said rotary input members, first and second portions of said connecting lever being adjacent said first and second rotary input members, respectively;
means for mounting said first portion of said connecting lever on said first rotary input member for movement along a first path having a component which extends radially of said first rotational axis whereby the radial spacing between the first portion of said connecting lever and said first rotational axis can be adjusted;
means for mounting said second portion of said connecting lever on said second rotary input member for movement along a second path having a component which extends radially of said second rotational axis whereby the radial spacing between the second portion of said connecting lever and said second rotational axis can be adjusted;

said connecting lever being movable in response to rotational movement of said first rotary input member about the first rotational axis when the first portion of said connecting lever is spaced from the first rotational axis and being movable in response to rotational movement of said second rotary input member about the second rotational axis when the second portion of said connecting lever is spaced from the second rotational axis;

an output member coupled to said connecting lever;

means for coupling said first means to said first rotary input member whereby the first rotary input member can be driven by said first input;

means for coupling the second means to said second rotary input member whereby the second rotary input member can be driven by said second input;

means for drivingly associating said output member and said control surface whereby said output member can position said control surface; and means for moving said first and second portions of said connecting lever along said first and second paths, respectively, to adjust the control which each of said first means and said second means has on the positioning of the control surface.

11. A control system as defined in claim 10 wherein said first portion of said connecting lever is a first end portion of said connecting lever, said first rotary input member has a face confronting said connecting lever, said means for mounting said first portion of said connecting lever includes a groove extending along said first path, said groove extending at least to said first rotational axis, said first end portion being receivable in said groove.

12. A control system as defined in claim 10 including means for mounting the connecting lever for movement in a plane in response to movement of one of the input members about its rotational axis when the end portion of the connecting lever associated with said one input member is spaced from the rotational axis of said one input member.

13. A control system as defined in claim 12 wherein said moving means includes a shifting member mounted for movement on said supporting structure, said connecting lever mounting means includes a slot in said shifting member, said connecting lever extending into said slot.

14. A ratio select mechanism comprising:
a supporting structure;
first and second rotary input members;
means for mounting said first and second rotary input members on said supporting structure for rotational movement about first and secnd rotational axes, respectively;
a connecting lever extending between said rotary input members, first and second portions of said connecting lever being adjacent said first and second rotary input members, respectively;
means for mounting said connecting lever for shifting movement between a first position in which the first portion of the connecting lever lies substantially on the rotational axis of the first rotary input member and the second portion of the connecting lever is spaced radially from the rotational axis of the second rotary input member and a second position in which the first portion of the connecting lever is spaced radially from the rotational axis of the first rotary input member and the second portion of the connecting lever lies substantially on the rotational axis of the second rotary input member;
said connecting lever having an output region;
means responsive to rotational movement of the first rotary input member about its rotational axis when the connecting lever is in said second position and responsive to rotational movement of said second rotary input member about its rotational axis when the connecting lever is in said first position for moving said output region of said connecting lever along an output path which extends generally transverse to both of said rotational axes; and
means for moving said connecting lever between said first and second positions thereof.

* * * * *